United States Patent [19]

Honda

[11] 4,080,587
[45] Mar. 21, 1978

[54] ECHO SOUNDER FOR DETECTING SCHOOLS OF FISH

[76] Inventor: Keisuke Honda, 37, Shinyoshi-cho, Toyohashi, Aichi, Japan

[21] Appl. No.: 680,846

[22] Filed: Apr. 27, 1976

[30] Foreign Application Priority Data

Apr. 30, 1975 Japan .................................. 50-52262

[51] Int. Cl.$^2$ ............................................. G01S 9/70
[52] U.S. Cl. .................................. 340/3 R; 340/3 F
[58] Field of Search .............. 340/3 F, 3 C, 3 R, 1 R, 340/15.5 GC

[56] References Cited

U.S. PATENT DOCUMENTS

| | | | |
|---|---|---|---|
| 3,109,154 | 10/1963 | Grada et al. | 340/15.5 GC |
| 3,309,650 | 3/1967 | Ross et al. | 340/3 F |
| 3,636,463 | 1/1972 | Ongkiehong | 340/15.5 GC |

Primary Examiner—Richard A. Farley
Attorney, Agent, or Firm—Burgess, Ryan and Wayne

[57] ABSTRACT

The present invention discloses an echo sounder for detecting schools of fish wherein the output signal from a transducer is amplified by a plurality of cascaded amplifiers so that the output from each amplifier may represent the received output signal higher in level than that represented by the output from the succeeding amplifier, and wherein the magnitude of one input current is controlled in response to the outputs from the amplifiers and converted into a voltage output signal to be applied to a recording pen of an electrical discharge type recorder. A school of fish may be distinctly displayed and clearly discriminated from the surface of the sea or the sea bottom.

4 Claims, 3 Drawing Figures

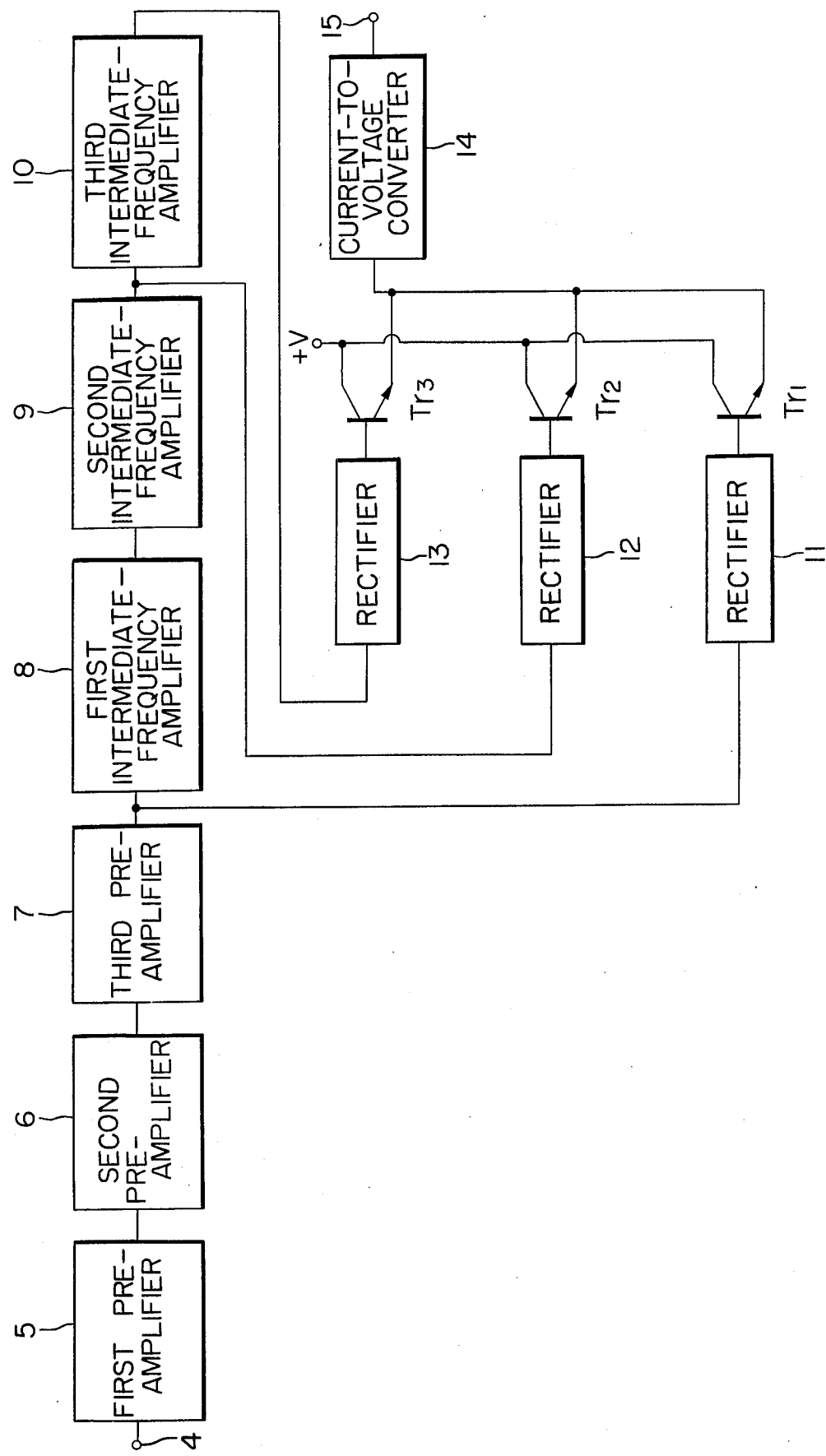

ECHO SOUNDER FOR DETECTING SCHOOLS OF FISH

BACKGROUND OF THE INVENTION

The present invention relates to generally an echo sounder for detecting schools of fish, and more particularly a circuit thereof for processing the signal to be applied to an electrical discharge type recorder.

In general, even when the level of the signal to be applied to a discharge type recorder is linearly changed, the density of the image recorded on a recording paper will not change linearly. Therefore when the electrical discharge type recorder is incorporated in an echo sounder for detecting schools of fish, the images of schools of fish near the surface of the sea or the sea bottom cannot be distinctly discriminated from the surface of the sea or the sea bottom which is displayed as the dense image or from the air bubbles near the surface of the sea or from the rocks at the sea bottom.

SUMMARY OF THE INVENTION

One of the objects of the present invention is therefore to provide an echo sounder incorporating an electrical discharge type recorder which may distinctly display the images of schools of fish near the surface of the sea or the sea bottom by suppressing the signals representative of the echo signals reflected back from the other objects.

To the above and other ends, the present invention provides an echo sounder for detecting schools of fish comprising a plurality of amplifiers cascaded in such a way that the output from each amplifier represents the output signal from a transducer which is higher in level than the output signal from the transducer represented by the output from the next or succeeding amplifier, a plurality of rectifiers the input terminal of each of which is connected to the output terminal of each of the amplifiers, and a plurality of control circuits the input terminal of each of which is connected to the output terminal of each of the rectifiers, whereby the outputs from the rectifiers are synthesized and applied to a recording pen of an electrical discharge type recorder, thereby enhancing the recording of the output signals from the transducer depending on the level thereof.

BRIEF DESCRIPTION OF THE DRAWING

FIG. 2 is a block diagram of one preferred embodiment of the present invention.

DESCRIPTION OF THE PREFERRED EMBODIMENT

Figure 1:
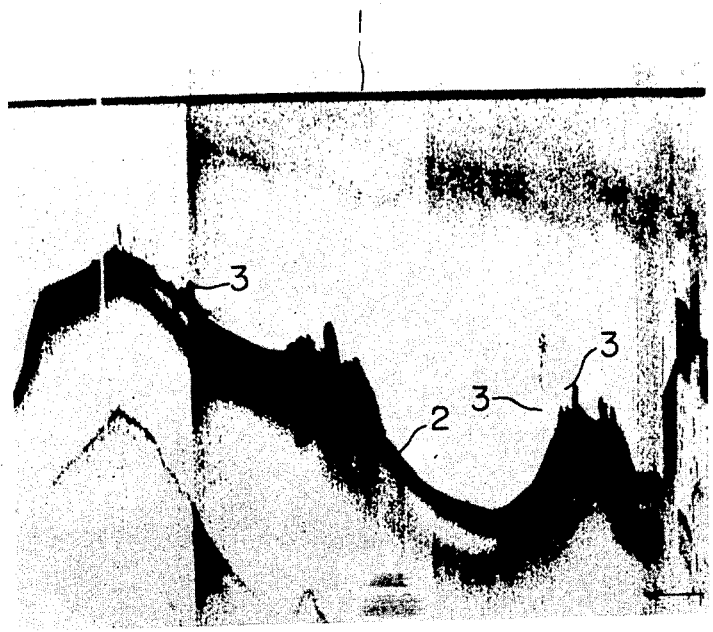
FIG. 1 is a photo of the record produced by a conventional electrical discharge type recorder of a conventional echo sounder for detecting schools of fish.

FIG. 1 shows a photo of the recording paper recorded by the conventional electrical discharge recorder incorporated in conventional echo sounder for detecting schools of fish. Reference numeral 1 denotes the surface of the sea; 2, the sea bottom; and 3, a school of fish swimming near the sea bottom. This record has the defects that the image of the school of fish 3 cannot be clearly distinguished from the image of the sea bottom 2 and that the bubbles closer to the surface of the sea are recorded as black dots so that schools of fish in these bubbles cannot be detected. The present invention was made to overcome these defects.

In FIG. 2, there is shown a block diagram of one preferred embodiment of an echo sounder for detecting schools of fish in accordance with the present invention comprising an input terminal 4 connected to an underwater transducer (not shown), cascaded first, second and third preamplifiers 5, 6 and 7, first, second and third intermediate-frequency amplifiers 8, 9 and 10, rectifiers 11, 12 and 13, a current-to-voltage converter 14 and an output terminal 15 connected to a recording pen or stylus (not shown).

Next the mode of operation of the echo sounder with the above construction will be described. A fraction of the input signal which is amplified by the first, second and third preamplifiers 5, 6 and 7 is applied to the first rectifier 11. That is, the signal above a predetermined level is applied to the first rectifier 11. The output from the third preamplifier 7 is applied to the first intermediate-frequency amplifier 8, which is coupled to the amplifier 9, and a portion of the output from the amplifier 9 is applied to the second rectifier 12. That is, the input signal above a predetermined intermediate level is applied to the second rectifier 12. The output signal from the third intermediate-frequency amplifier 10 to the third rectifier 13 includes all of the transducer output signals applied to the input terminal 4.

The outputs from the first, second and third rectifiers 11, 12 and 13 are applied to the bases of transistors Tr1, Tr2 and Tr3 so that the current which flows from a voltage source +V has a magnitude which is dependent upon the outputs of the rectifiers 11, 12 and 13. The current is converted into a voltage by the current-to-voltage converter 14, and the output voltage is applied through the output terminal 15 to the recording pen and is recorded upon an electrical discharge recording paper (not shown).

Therefore in response to the low-level signal received at the input terminal, the output signal is derived only from the third rectifier 13. In response to the intermediate-level input signal, the output signals are derived from both the second and third rectifiers 12 and 13. In response to the high-level signal, the output signals are derived from all of the rectifiers 11, 12 and 13. Therefore the high-level input signal which represents the echo reflected back from the surface of the sea or the sea bottom is amplified and clearly recorded so that the boundary line of the surface of the sea or the sea bottom can be distinctly displayed and can be clearly discriminated from the intermediate-level input signal representing the echo reflected back from a school of fish or the low-level input signal representative of the echo reflected back from the scattering layers of minute marine life such as plankton.

In the present embodiment, the input signals have been described as being divided into three groups depending upon their level, but it is to be understood that the present invention is not limited thereto. For instance, the input signals may be divided into more than three groups so that the record which is considerably clearer and more distinct than the record obtained by the conventional echo sounder can be obtained.

Figure 3:
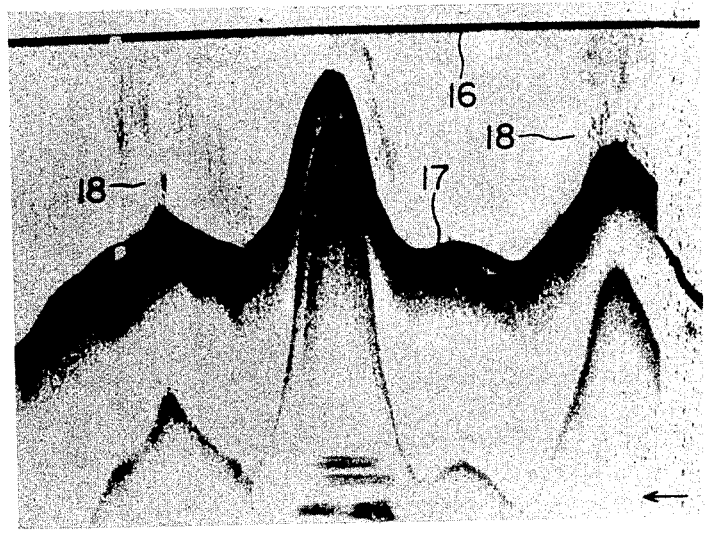
FIG. 3 is a photo of the record produced by the echo sounder in accordance with the present invention.

FIG. 3 is the record obtained by dividing the input signals into two groups. It is seen that the images of schools of fish 18 near the sea bottom 17 are distinctly recorded against the surface of the sea 16 and the sea bottom 17. Furthermore the bubbles are not recorded so that the schools of fish moving in the sea water can be distinctly displayed.

As described above, according to the present invention, depending upon the level of the input signals received, they are separately amplified and rectified to obtain the signal voltage representative of the input signal higher or lower than a predetermined level. Therefore the schools of fish can be distinctly displayed and the species of fish can be more readily distinguished. Furthermore without the provision of means for discriminating the image of a school of fish from the sea bottom, they can be clearly discriminated from each other. Moreover, the quantity of carbon powder produced by the electrical discharge between the recording pen and a recording paper is remarkably dicreased so that a long service life of the recording pen can be ensured.

What is claimed is:

1. An echo sounder circuit for coupling an underwater transducer to a recording or display device, said circuit comprising:
    a preamplifier having an input terminal for receiving an input signal from said transducer, and a first output terminal;
    a first intermediate amplifier having an input terminal coupled to said first output terminal, and a second output terminal;
    a second amplifier having an input terminal coupled to said second output terminal, and a third output terminal;
    first, second and third rectifiers each having an input terminal and an output terminal;
    means for combining the signals appearing at the output terminals of said rectifiers and for coupling the resulting composite signal to said recording or display device;
    means for coupling a signal, corresponding to that position of the signal at said first output terminal which exceeds a first threshold level, from said preamplifier to said input terminal of said first rectifier;
    means for coupling a signal, corresponding to that portion of the signal at said second output terminal which exceeds a second threshold level, from said first intermediate amplifier to said input terminal of said second rectifier; and
    means for coupling a signal from said second amplifier to said input terminal of said third rectifier,
    said threshold levels being such that (i) a signal corresponding to a high level portion of said transducer signal appears at the output terminals of said first, second and third rectifiers (ii) a signal corresponding to an intermediate level portion of said transducer signal appears at the output terminals of only said second and third rectifiers, and (iii) a signal corresponding to a low level portion of said transducer signal appears at the output terminal of only said third rectifier,
    whereby the differences between said low, intermediate and high signal portions are enhanced in said composite signal.

2. An echo sounder circuit as set forth in claim 1, further comprising first, second and third transistors connected to respective output terminals
    of said first, second and third rectifiers, and a current-to-voltage converter for converter for converting current output signals from said transistors into a composite voltage output signal.

3. An echo sounder circuit for coupling an underwater transducer to a recording or display device, said circuit comprising:
    a first amplifier having an input terminal for receiving an input signal from said transducer, and a first output terminal;
    a second amplifier having an input terminal coupled to said first output terminal, and a second output terminal;
    first and second rectifiers each having an input terminal and an output terminal;
    means for combining the signals appearing at the output terminals of said rectifiers and for coupling the resulting composite signal to said recording or display device;
    means for coupling a signal, corresponding to that portion of the signal at said first output terminal which exceeds a first threshold level, from said first amplifier to said input terminal of said first rectifier;
    means for coupling a signal from said second amplifier to said input terminal of said second rectifier,
    said threshold level being such that a signal corresponding to a relatively high level portion of said transducer signal appears at the output terminals of both of said rectifiers, while a signal corresponding to a relatively low level portion of said transducer signal appears only at the output terminal of said second rectifier,
    whereby the differences between said relatively low and relatively high level portions are enhanced in said composite signal.

4. An echo sounder circuit as set forth in claim 3, further comprising first and second transistors connected to respective output terminals of said first and second rectifiers, and a current-to-voltage converter for converting current output signals from said transistors into a composite voltage output signal.

* * * * *

UNITED STATES PATENT OFFICE
CERTIFICATE OF CORRECTION

Patent No. 4,080,587                    Dated March 21, 1978

Inventor(s) Keisuke Honda

It is certified that error appears in the above-identified patent and that said Letters Patent are hereby corrected as shown below:

Column 4, line 13: Cancel "for converter".

Signed and Sealed this

Thirty-first Day of October 1978

[SEAL]

Attest:

RUTH C. MASON  
Attesting Officer

DONALD W. BANNER  
Commissioner of Patents and Trademarks